United States Patent [19]

McMahan

[11] 4,141,374
[45] * Feb. 27, 1979

[54] TRAILER WASHING APPARATUS

[75] Inventor: Richard C. McMahan, La Salle, Colo.

[73] Assignee: Wash Wagon Corporation, Lakewood, Colo.

[*] Notice: The portion of the term of this patent subsequent to Aug. 10, 1993, has been disclaimed.

[21] Appl. No.: 785,196

[22] Filed: Apr. 6, 1977

Related U.S. Application Data

[63] Continuation of Ser. No. 696,647, Jun. 16, 1976, abandoned.

[51] Int. Cl.² ............................ B08B 3/02; B08B 9/00
[52] U.S. Cl. ........................................ 134/46; 134/104; 134/168 R; 239/184; 239/187
[58] Field of Search ............................ 134/45–46, 134/104, 123, 152, 167 R–168 R, 172; 118/306; 239/184, 186–187

[56] References Cited

U.S. PATENT DOCUMENTS

| 3,439,689 | 4/1969 | Zadron et al. | 134/104 |
| 3,461,889 | 8/1969 | Saxonmeyer | 134/45 X |
| 3,534,746 | 10/1970 | Posner | 134/46 |
| 3,830,430 | 8/1974 | Hartunian | 134/45 X |
| 3,957,203 | 5/1976 | Bullard | 239/187 X |
| 3,961,983 | 6/1976 | Crandall et al. | 134/45 X |
| 3,973,988 | 8/1976 | McMahan | 134/46 |

FOREIGN PATENT DOCUMENTS

503756 3/1976 U.S.S.R. ................................. 134/123

Primary Examiner—Robert L. Bleutge

[57] ABSTRACT

A motor driven carriage includes nozzles for directing a cleaning solution to the inside of a trailer on an inward trip and means for stopping movement of the carriage as it approaches the front wall of the trailer. The return cleaning trip is delayed until the rinse water has cleared the cleaning solution from the supply hose. Several alternative dock arrangements are described whereby the carriage-mounted cleaning system may be used for cleaning trailers backed up to opposite sides of the dock, for trailers driven along-side the dock, or for cleaning a plurality of trailers each backed up to the same side of an elongate dock. The heating water and rinse water supply, storage and heating systems of the invention are described, as are the systems for permitting recirculation of water with the various dock arrangements. Finally, a system is described which permits diversion of water draining from the trailers, a feature which is especially valuable if a pre-rinse of dirty trailers is desired or required by the nature of the materials transported in the trailer prior to cleaning.

5 Claims, 20 Drawing Figures

Fig_1

Fig_2

Fig_3

Fig_4

Fig_5

Fig_6

Fig_7

Fig_8

Fig_9

Fig_10

Fig_11

*Fig_12*

*Fig_13*

*Fig_14*

*Fig_17*

Fig_18

Fig_19

Fig_20

TRAILER WASHING APPARATUS

This application is a continuation of Ser. No. 696,647 file June 16, 1976 and now abandoned. su This invention relates to trailer washing apparatus, and more particularly to apparatus for washing the inside of a large over the road trailer (normally a semi-trailer, to use a more exact term) which is usually driven by a tractor. This application also relates to similar subject matter as my prior co-pending application Ser. No. 541,714, filed Jan. 17, 1975, now U.S. Pat. No. 3,973,988.

The invention is particularly adapted for use in washing the inside of trailers which have been used in hauling meat, but may be utilized for trailers which have been used for hauling other products. It has been proposed, as in U.S. Pat. No. 3,534,746, to utilize a portable cleaner having a frame which supports a rectangular configuration of piping, with spray nozzles directed laterally from each of the pipes. The frame is propelled into and out of the trailer by a reversible electric motor. However, the spray nozzles are not adapted to readily wash the front inside wall of the trailer and require adjustment for trailers of different heights.

It has been proposed, as in U.S. Pat. No. 3,830,430, to provide a motor driven cleaning vehicle on the upper front of which a series of spray nozzles are rotated in both a plane normal to the floor of the trailer and a plane parallel to the floor of the trailer. The vehicle is guided into a central position by a pair of pivotally connected rollers at each side which are urged outwardly by springs and are adapted to engage the inner side walls of the trailer. However, the supporting equipment for the vehicle, i.e. those which provide heated, soapy water for washing and heated, clear water for rinsing, are not integrated with the vehicle. Also, the structure of each of the above patents is normally operable into a trailer from a single position and also has no particular equipment which will enable a plurality of trailers to be washed in succession with a minimum of time for each.

The present invention, in general, utilizes a wheeled carriage for movement into and out of the inside of a trailer with heated, soap wash water being sprayed onto the inside surface of the trailer by a series of rotating nozzles, during movement into the trailer, and rinse water sprayed on the inside surfaces of the trailer on the return movement. This carriage may be electrically driven and carries a limit switch which engages the front wall of the trailer, for stopping carriage movement. Then, reversal of the carriage motor is accomplished by a manual switch, which also switches the valving, so that rinse water, instead of soapy or wash water, is supplied to the pump. A time delay relay is connected in series with the switch, to permit the wash water to clear the line to the rotary nozzles, before the carriage is reversed, so that rinse water will be sprayed into the trailer before the carriage starts its return movement.

In one embodiment, a soapy wash water tank and a rinse water tank are disposed within a dock, to either end of which a trailer may be backed, so that a trailer at one end of the dock may be cleaned and the carriage shifted for use in cleaning the trailer at the other end of the dock, while the first trailer is being moved and the next trailer is being backed into position. In addition, a platform provided with wheels or casters is mounted on the dock for rotation through 180° and back again, carrying the washing and rinsing carriage with it. This platform also supports the motor driven reels for the wash water and rinse water hose and a reel for an electrical cable which extends to the carriage.

In this embodiment, a wash water tank is formed within the dock at each end thereof, so that both used wash water and used rinse water may drain from the trailer being washed and into the wash water tank at that end of the dock. The two wash water tanks are connected by a pipe which equalizes the level of liquid in the two tanks, while the rinse water is supplied to a center tank in the dock. The wash and rinse water are heated by burners adapted to use either gas or oil, which discharge into rectangular housings submerged in the wash water and then travel through vertically spaced pipes extending through the rinse water tank and then around and through the opposite wash water tank to a muffler and discharge. In an alternative carriage, two rotating water discharge heads are mounted side by side on the carriage, in order to decrease the distance between the discharging nozzles and the inner side walls of the trailer. This carriage is otherwise similar to the carriage referred to above.

In another embodiment of this invention, the dock containing a heated wash water tank and a heated rinse water tank is spaced to one side of the path of movement of the trailer, with a movable platform on which the carriage is placed when not within the trailer, abutting the dock. When a trailer is driven into position just past the platform, the latter is moved through 90° to abut the rear edge of the trailer and ramps for the trailer wheels let down, whereupon the washing cycle of the trailer can begin. The platform for the trailer carries a waste tank, into which both used wash water and used rinse water drain, with a pump for transferring the used water to the wash water tank. The construction and operation of the carriage may be similar to that of the first embodiment, with preference given to the alternative carriage. The platform is pivoted back to its original position for movement of the next trailer into washing position. Each embodiment is adapted to wash the inside of a trailer, the outside of which has been or will be washed by a suitable outside washer, which operates on the outside of either a stationary trailer or, as more usual, a moving trailer. In the latter instance, the outside washing equipment will be essentially stationary.

The foregoing and additional features of the trailer washing apparatus of this invention, together with the details of the construction thereof, will become apparent from the following description, taken in conjunction with the accompanying drawings, in which.

Figure 1:
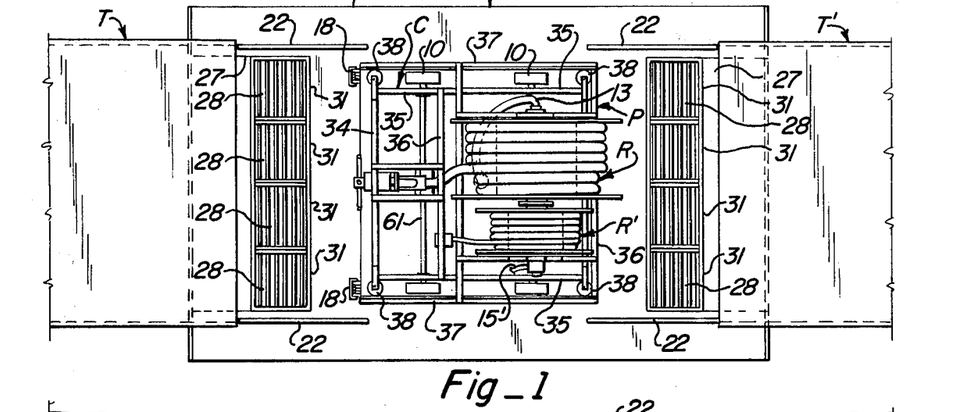
FIG. 1 is a top plan view of a trailer washer of this invention, including portions of two trailers backed up against a dock for washing in succession.
Figure 2:
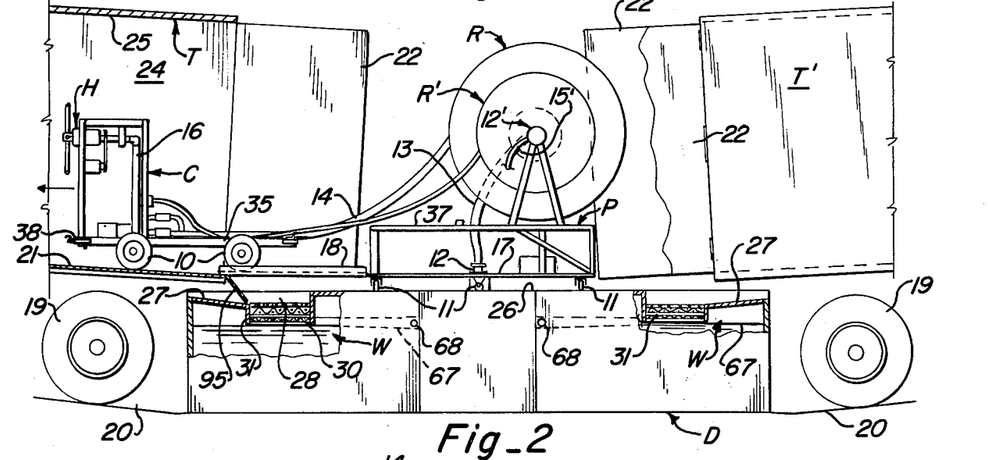
FIG. 2 is a side elevation of the trailer washer of FIG. 1, with one trailer in vertical section and showing a washing carriage as having entered that trailer.
Figure 3:
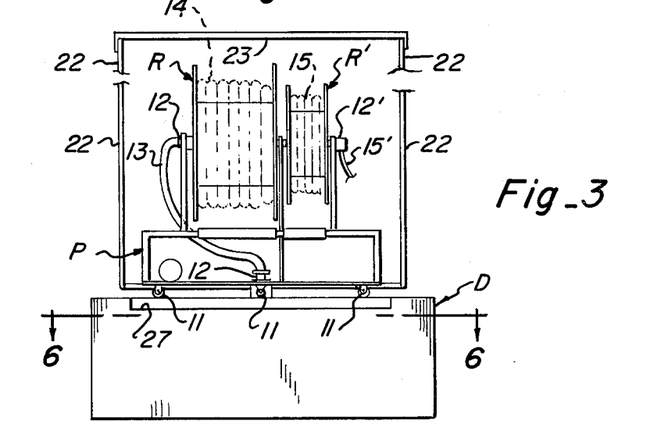
FIG. 3 is a front elevation of the trailer washer of FIG. 1 showing a platform remaining on the dock after the carriage has left.

As illustrated in FIGS. 1-3, a trailer washer of this invention may include a self-propelled carriage C having wheels 10 and disposed, when not in use, on a platform P having casters 11, for pivotal movement about the top of a dock D. Below the center of the platform P is a swivel joint 12 about which platform P pivots and to which hot, soapy water and rinse water are supplied in turn through hose 13 to a connection at the center of a reel R on which a hose 14 is wound. Hose 14 supplies the wash and rinse water in turn to the carriage C as it moves within a trailer T, initially in the direction of the arrow of FIG. 2 and then in the reverse direction. A reel R', mounted for rotation on the same axis as the reel R, is adapted to receive an electrical cable 15 which supplies electricity, both power and controls, to drive the carriage C into the trailer to the forward end thereof, and then back out of the trailer. Cable 15' of FIGS. 1-3 supplies electricity, for both power and controls, through a suitable rotating joint 12' connected with cable 15 mounted on reel R'. A pipe 16 on the carriage C carries cleaning and then rinsing liquid to a rotating head H. The carriage C is normally stored on the platform P, on a floor 17 thereof, but when moving into a trailer, such as the trailer T, moves over ramps 18 which are preferably light in weight, such as aluminum channels. The ramps 18 are readily stored on the platform P after the carriage is moved back onto the platform following the washing of a trailer, such as the rear edge of each ramp 18 being hinged to the front edge of floor 17 of the platform and each ramp being moved to an upright position, as in FIG. 1, for storage. Each ramp may be connected by a cable attached to the outside edge of the ramp and also a counterweight (not shown) moving upwardly or downwardly alongside an upright post (not shown) at the corresponding rear edge of the platform P. Then, the platform P may be rotated through 180°, so that the ramps 18 may be positioned to permit the carriage to roll into the interior of a trailer T'. As will be evident, while the trailer T' is being washed, the trailer T may be driven away and the next trailer backed into position for washing. The rear wheels 19 of each trailer T and T' are driven rearwardly onto a rearwardly inclined ramp 20, which causes a downward and rearward tilt of the trailer sufficient to permit the wash water, and later the rinse water, injected into the interior of the trailer, to drain rearwardly along the floor 21 of the trailer. The rear doors 22 of the trailer are swung to the outside, but in line with the side walls so that they may be cleaned by the rotating head H, the cleaning fluid being turned on when the head H is just past the rear edge of the doors. Some hand cleaning may be necessary, although there is usually plenty of soapy water on the doors, for this purpose. If desired, a flanged sheet of light metal 23 of FIG. 3, such as aluminum, may be placed on top of the doors to extend between them and prevent discharge of the wash or rinse water into the air. The inside surface of a trailer to be cleaned includes not only the floor 21, but also the side walls 24 and the ceiling 25, in addition to the front wall, which is conventional and has not been shown.

The platform P rests on a floor 26 of the dock D, which is provided at each end with a shallow sump 27 which receives the water draining from the trailer floor, for passage to a wash water tank W. In so draining, the water from the trailer will pass through an aperture covered by a grating 28, underneath which a coarse screen 29 and a fine screen 30 are mounted, as in a frame 31, which may be divided into rectangular sections, as in FIG. 1. If desired, the grating 28 may extend the full width of the opening, with each frame 31 enclosing only a section of the respective screen.

The carriage C, as in FIGS. 1, 2, 4 and 5, is provided with a front beam 34 and a pair of side beams 35, between which the front beam, as well as a lateral center beam 36, extends. As in FIG. 1, the side beams 35 extend rearwardly to the rear wheels, with the rear wheels being merely journaled thereon. Thus, in storage position, the side beams 35 and rear wheels are spaced laterally from the swivel 12 and hose 13, while the center beam 36 is disposed forwardly from the swivel. The reels R and R' and the motors for driving the same are elevated by a framework 37, beneath which the rear wheels 10 and side beams 35 may pass. Side guide rollers 38 are mounted on bars 39 at each corner of the carriage and extend laterally beyond the supporting wheels 10. Thus, the side beams 35 are spaced apart a distance which will permit side rollers 38 to accommodate the narrowest width of trailer expected to be encountered. The guide rollers 38 may be solidly mounted, since a few inches difference in the lateral position of the carriage is unimportant.

Figure 4:
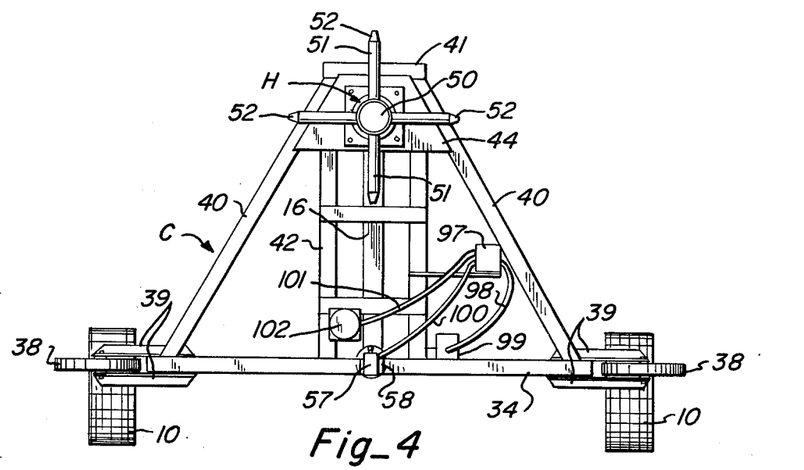
FIG. 4 is a front elevation, on an enlarged scale, of the washing carriage.
Figure 5:
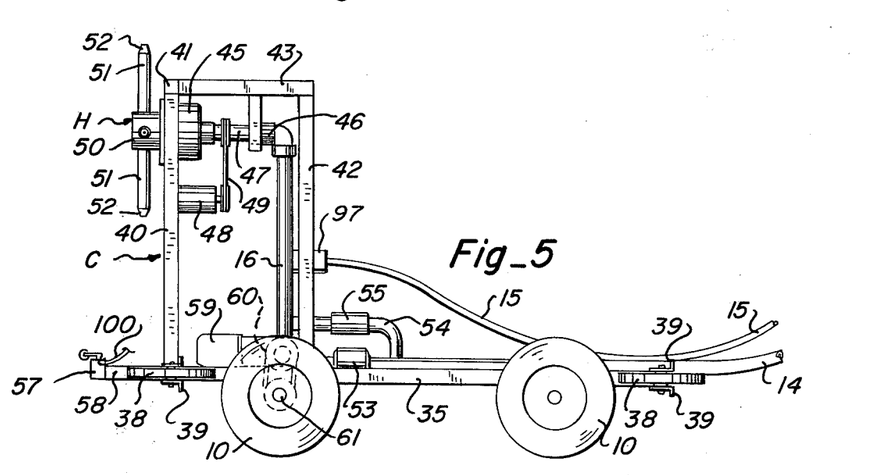
FIG. 5 is a side elevation of the washing carriage, on the same scale as FIG. 4.

The rotating head H, as in FIGS. 4 and 5, is supported by an A-frame comprising a pair of side beams 40 inclined toward each other and connected at the top by a lateral beam 41, while the lower ends of beams 40 are mounted on the chassis side beams 35. A trellis 42, which comprises a pair of upright beams connected by cross beams, is supported by the center lateral beam 36, while the upper ends of the trellis are connected to the upper end of the A-frame support by longitudinal beams 43. Rotating head H is supported by a trapezoidal mounting panel 44 on which is mounted a bearing assembly 45. The head H is supplied with water from pipe 16 through pivot joint 46 into which a pipe 47 extends, the latter being rotated by a drive motor 48 connected thereto by a belt and pulley 49, or a chain and sprocket connection. The head H includes a hub 50 mounted on the extended end of pipe 47 and carrying four equally spaced pipes 51, each provided with a nozzle 52. Each nozzle 52 may discharge a round rather than a flat stream, such as about ⅜ inch in diameter at the nozzle and about 3 inches in diameter when it reaches a side wall, with a greater impact on the floor and ceiling. The impact of such streams is sufficient to spread the stream on the walls and is also sufficient to wash the front wall of the trailer space by splashing. The speed of rotation of head H, such as about 60 r.p.m., is such that an overlapping of both the wash water and rinse water, during rotation of head H, is produced as the carriage proceeds into and back out of the trailer. Too slow a speed of rotation may cause the head H to produce a spiral pattern on the trailer walls, with less vigorously washed areas between the spirals. A motor driven pump 53 is interposed prior to pipe 16 and increases the flow and pressure of the soapy wash water, which may, of course, be formed through the use of a suitable detergent, through the pipe 16 to the head H. If it is found to be unnecessary to operate the pump 53 during the rinse cycle, the pump 53 may be bypassed by a pipe 54 in which is installed a solenoid operated valve 55. At the front of the carriage C, at the center, a limit switch 57 is mounted on a forwardly extending bar 58, which may automatically stop the carriage C, when the inside front wall of the trailer is reached. The flow of wash water is terminated at that time, in a manner described below, with a shift to rinse water supplied through hose 14. A drive motor 59 having an integral gear box, as in FIG. 5, is connected by a chain and sprocket conneection 60 with a shaft 61 connecting the two front wheels 10, while a time delay of the reversal of the motor 59 is effected to permit wash water to clear the nozzles 52, before the carriage C is reversed for return to the platform P, to insure that the front wall and adjacent side wall portions of the trailer space are rinsed with clear water.

Figure 6:
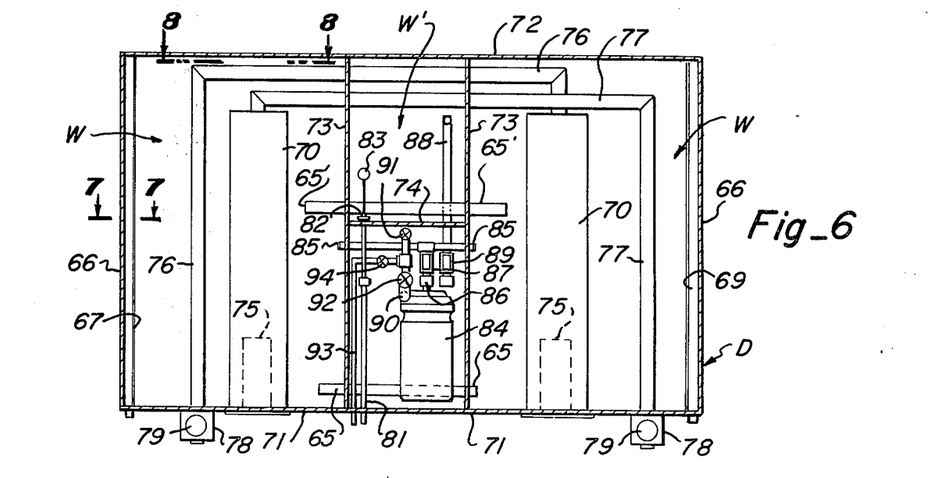
FIG. 6 is a horizontal section taken along line 6—6 of FIG. 3, just beneath the top of the dock.
Figures 7, 8:
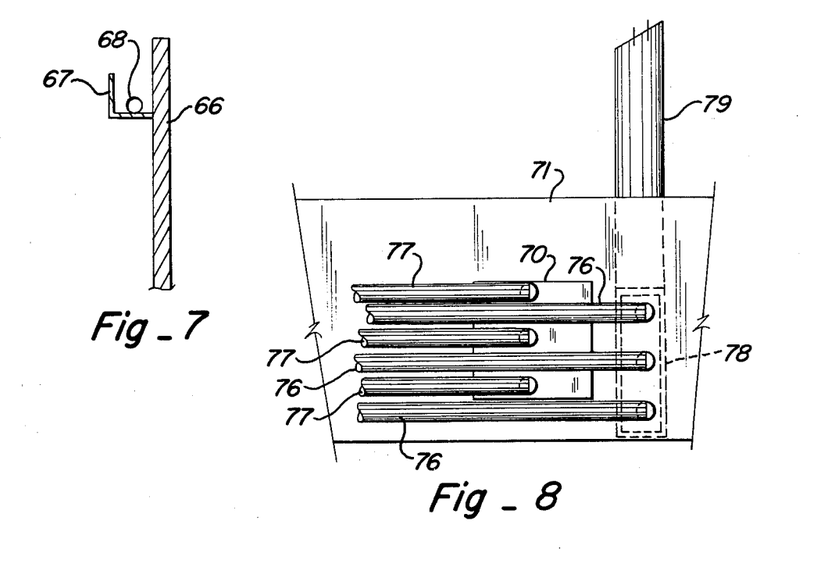
FIG. 7 is a fragmentary vertical section on an enlarged scale, taken along line 7—7 of FIG. 6 and showing particularly an overflow baffle within a wash water tank.
FIG. 8 is a fragmentary vertical section on an enlarged scale and taken along line 8—8 of FIG. 6, showing a portion of a heating manifold and piping.

In the dock D, as in FIG. 6, a wash water tank or compartment W is formed adjacent each end of the dock, the wash water tanks W being considerably larger than a rinse water tank W′, which may occupy approximately half of the space between the two wash water tanks W. The rinse water tank W′ is smaller, since the amount of wash water, for instance, may be on the order of 200 gallons per minute for 3 minutes of travel, as at 15 feet per minute, of the carriage C into the trailer, or a total of 600 gallons, while the rinse water may be supplied at a rate of 50 gallons per minute, for a total of 150 gallons for a 3 minute return trip of the carriage, again as at 15 feet per minute. The wash water tanks W are connected by a lower pipe 65 and an upper pipe 65′, to equalize the level of liquid therein, while each tank W, along an end wall 66, is provided with an overflow trough 67, as in FIG. 7, to remove grease and the like for discharge, as to a sewer, through an outlet 68. A manifold 70 of a sufficient size, as indicated in FIG. 8, extends from one side wall 71 of the dock D to a position adjacent the opposite side wall 72, as in FIG. 6. A common wall 73 separates the rinse water tank W′ from each of the wash water tanks, while a partition 74 forms the end of the rinse water tank W′ opposite the dock wall 72. A burner 75, which preferably is able to utilize either oil or gas, is installed within each manifold 70, with the end of manifold 70 at side wall 71 being provided with a conventional, adjustable device (not shown) for regulating the air supplied to burner 75. The heating flames from the burner 75 heat all four sides of the manifold 70, as well as the opposite end, so that heat will be transferred correspondingly to the liquid in the respective wash water tanks W. In addition, from the inner end of the respective manifold 70, the hot gases are led by a series of pipes 76 from one manifold and a series of pipes 77 from the other manifold, through a portion of the initial wash water tank. Each series of pipes then extends through the common wall 74 for heating the liquid in the rinse water tank W′, then through and around the manifold 70 of the opposite wash water tank W, to and through the side wall 71. The pipes 76 and 77 may be spaced apart vertically, as in FIG. 8, while the series of pipes 76 may be horizontally spaced from the series of pipes 77, as in FIG. 6.

From the side wall 71, the respective pipes 76 and 77 extend to a muffler 78, for exhaust through a stack 79. Since the temperature of the rinse water need not be as high as the temperature of the wash water, the amount of heat supplied to the wash water tanks may be greater than the amount of heat supplied to the rinse water tank. As indicated previously, the supply of water for the wash water tanks W is obtained by drainage of both wash water and rinse water from the trailer being washed, into the respective shallow sump 27 and through the grating 28 and associated screens. However, the rinse water in the tank W′ is fed into the tank as makeup water, as from a water line 81 of FIG. 6 supplying a feed valve 82 controlled by a float 83. A motor driven pump 84 is adapted to supply wash water and rinse water, alternately, to the swivel connection 12. A common inlet 85, which extends through the respective common wall 73 into the respective wash water tank W, is connected to an inlet 86 of motor pump 84, through a solenoid operated valve 87, which controls the connection of inlet 85 to the pump. Similarly, an inlet 88 for the rinse water leads from the rinse water tank to a solenoid valve 89, which controls the connection to inlet 86 of the pump. A pump outlet 90 extends to a connection 91 for the swivel joint 12, while a manually operated valve 92 may be closed when it is desired to introduce rinse water from an outside source, as through a pipe 93 which connects to the pump outlet line. The flow of the alternate source of rinse water is controlled by a manually operated valve 94, access to which and other manually operated valves may be obtained through a door in the side wall at the space in which pump 84 and other piping and valves are installed.

During normal operation of the carriage C, the individual wheel ramps 18 for the carriage wheels at each side are swung down to horizontal position. A starting switch, of a conventional nature, is then pushed to cause the drive motor 59 to start and the carriage to move forwardly across the ramps 18 and into the interior of the trailer. As the front end of the carriage reaches the rear doors of the trailer, an additional limit switch for starting the motor of pump 84, in the dock, and the motor of pump 53, on the carriage, as well as for motor 48, to rotate the head H, is pushed to start the pumps in operation and supply the wash water to the rotating nozzles of the head H. During movement, the side rollers 38 will maintain the carriage C in a reasonably straight, forward path. As soon as the inner end of the trailer is reached, the limit switch 57 will engage the inner front wall of the trailer, to turn off the drive motor 59, as well as pump motor 53. Such a connection will also shift solenoid valve 87 to closed position, to stop the flow of wash water to the pump 84. Then, a start button is pushed, which will restart pump 84 open solenoid valve 89 for rinse water and initiate reversal of drive motor 59 of carriage C, as well as open solenoid valve 55 on the carriage, which is set to permit a lower flow of rinse water through bypass 54, such as 50 gallons per minute, as referred to previously. The electrical circuit preferably includes a time lag device, as described later, which causes the carriage C to stop at the end of its inward path a sufficient time, before the drive motor 59 is reversed, for the rinse water to reach the nozzles 52 of the head H and start spraying the rinse water against the inside of the trailer, together with splashing on the front wall, before the return trip is started. The velocity of both the wash water and the rinse water, ejected by nozzles 52, is preferably such that the front wall of the trailer space is washed by splashing from the side walls, floor and roof. When the drive motor 59 is reversed, the carriage C will, of course, back out from the inside of the trailer, spraying rinse water from the nozzles of head H onto successive but overlapping spiral areas of the inside walls of the trailer. Just before the spray nozzles of head H have reached the rear edge of trailer doors 23, the tank pump 84 is turned off manually or by a limit switch, but the carriage is permitted to continue its rearward movement until it has reached the storage position on the floor 17 of platform P with the rear portion of the side bars 35 of the carriage and the associated rear wheels 10 beneath the framework 37 of the platform.

When the carriage reaches the inner end of the trailer, the drive motors for the reels R and R' will be reversed as soon as the drive motor 59 is reversed, to wind up the hose 14 and cable 15 on the respective reels. Also, when the carriage C reaches the storage position, both the drive motor 59 and the reel turning motors are stopped, as by a limit switch connection for both. The ramps 18 are then swung up to the upright position of FIG. 1, so that the platform P may-be turned 180° to a position in which trailer T' may be cleaned. To facilitate the drainage of wash and rinse water onto the shallow sump 27, a pair of telescoping guides 95 of FIG. 1, as of galvanized steel, may be placed at the end of the trailer and onto sump 27. The rear edge of trailer floor 22 normally has several steps, to accommodate sealing steps of the rear doors, with drainage guides 95 being placed on one of these steps.

Figure 9:
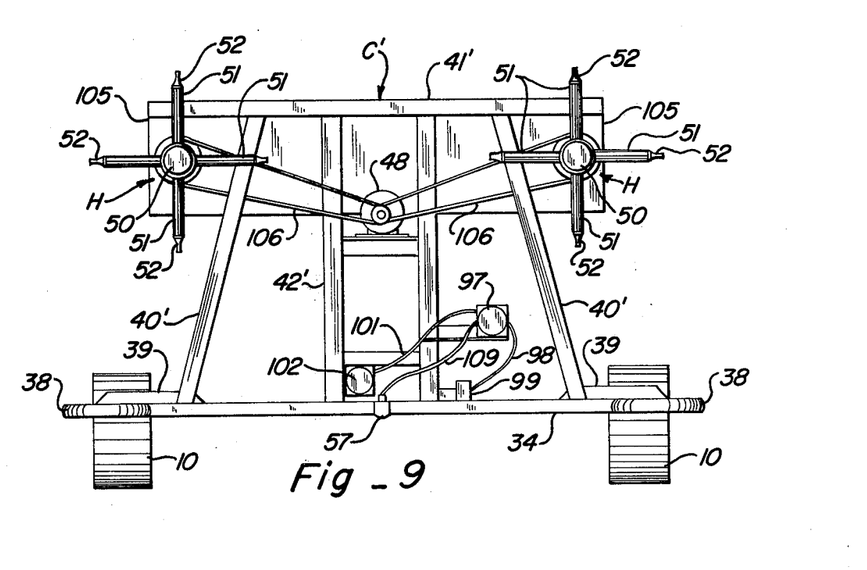
FIG. 9 is a front elevation of an alternative carriage.

The alternative carriace C' of FIG. 9 has a pair of heads H, one at each side, but is otherwise similar to the carriage C of FIGS. 4 and 5, having a front beam 34 and side beams on which wheels 10 are mounted for rotation, as well as side guide rollers 38 and bars 37 for supporting them. A trellis 52 extends upwardly from a lateral center bar, as before, while side beams 40' extend upwardly and inwardly from the opposite sides, at the front, to a lateral top beam 41'. Each head H is mounted for rotation on a mounting plate 105 which extends between top beam 41' and side beams 45, as at the positions shown, so that the heads may be rotated with the nozzles 52 spaced from the side walls during rotation. Nozzles 52 are mounted on pipes 51, in turn mounted on a hub 50, as before, while the extreme lateral position of nozzles 52, in turn, is spaced inwardly from a vertical plane extending through the outer edges of guide rollers 38. The dual heads H are more effective in cleaning the side walls of the trailer T or T', being driven from a motor 48' through a dual belt and pulley or sprocket and chain connection 106. The carriage of FIG. 9 is operated and controlled similarly to the carriage C, as described previously.

Figure 10:
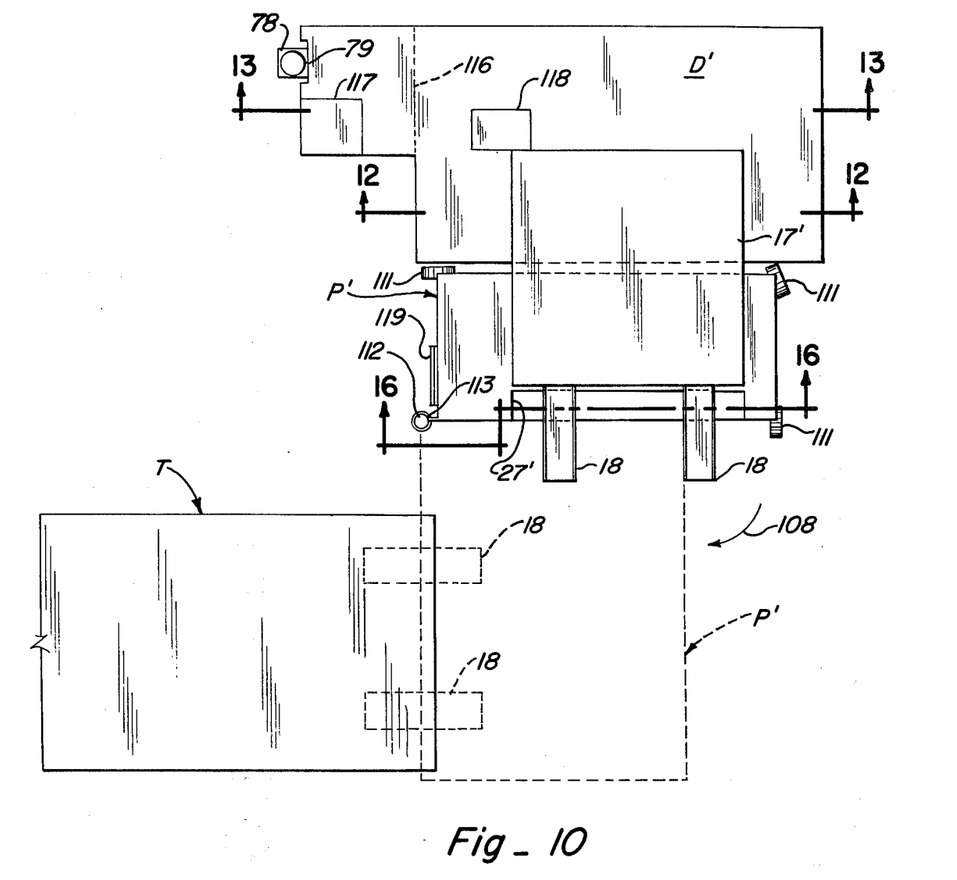
FIG. 10 is a top plan of an alternative embodiment, which includes a carriage platform movable 90° to the operating position, indicated in dotted lines.
Figure 11:
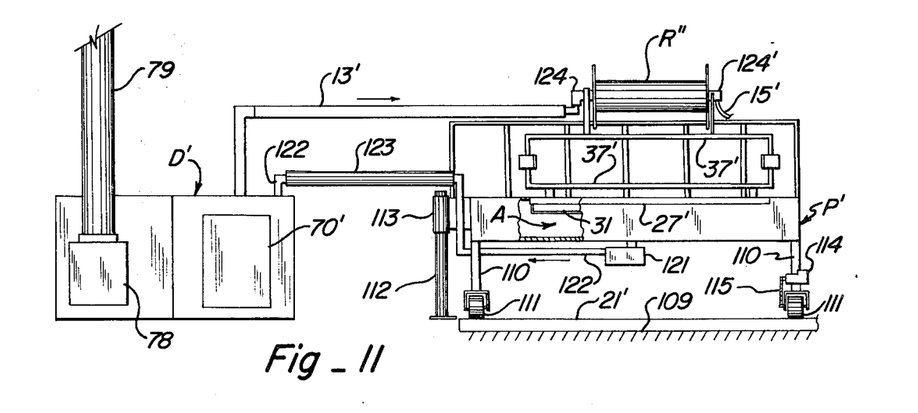
FIG. 11 is a front elevation of the embodiment of FIG. 10, with the platform in pivoted position.
Figure 14:
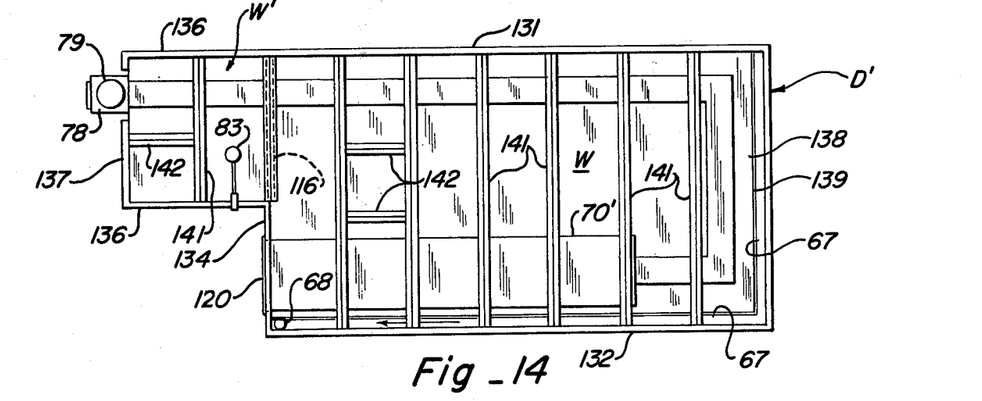
FIG. 14 is a top plan view of the dock with the top removed to show interior parts thereof.
Figure 15:
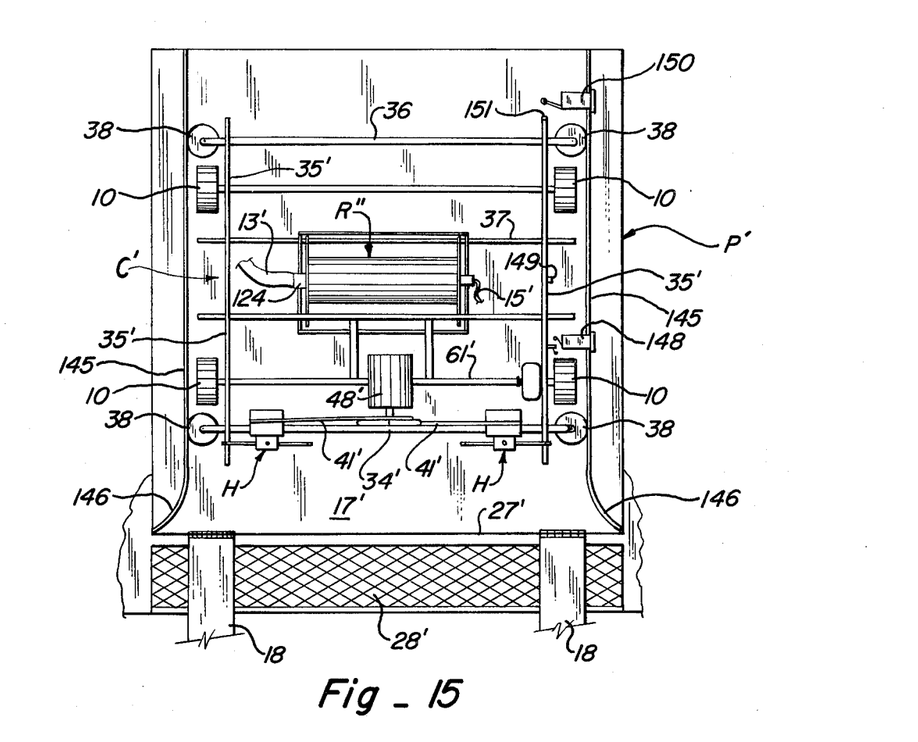
FIG. 15 is a top plan view of the platform, showing the carriage thereon.
Figure 16:
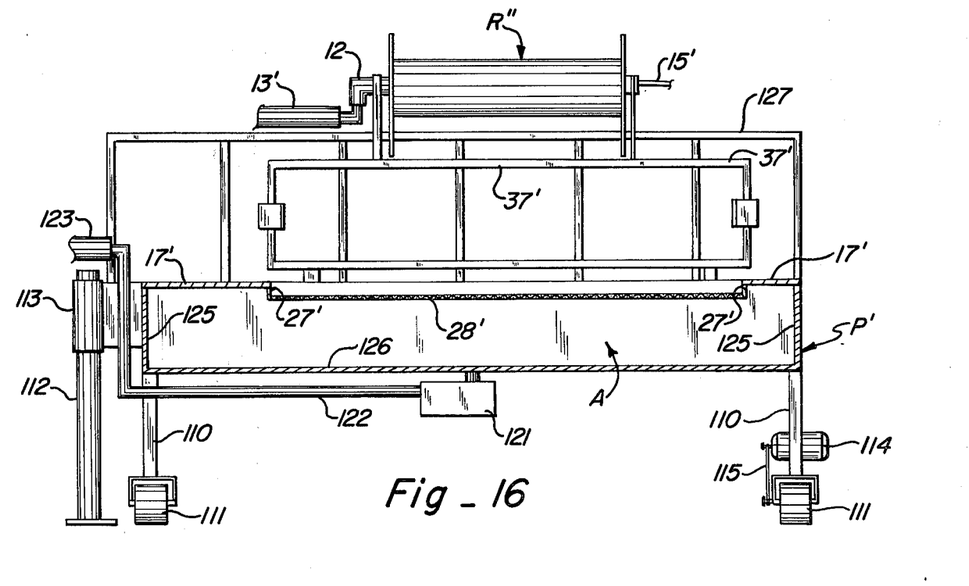
FIG. 16 is a vertical section taken along line 16—16 of FIG. 10.

In the embodiment illustrated in FIGS. 10–16, a dock D' containing the wash water tank and rinse water tank is stationary, while a platform P' is movable from the full position to the dotted position of FIG. 10, through 90°, as indicated by the arrow 108. In the dotted position, the front of the platform P' will be above the rear end of a ramp 21', which is provided with a sink 109 for placing the rear wheels of the trailer, normally dual wheels, at a lower elevation than the front of the trailer, so that the trailer will slope downwardly toward the platform P'. The carriage ramps 18 are shown in the full position of platform P' as extended therefrom, but will, in reality, be pivoted upwardly corresponding to the position shown in FIG. 1. When the platform P' has reached the dotted position of FIG. 10, the ramps 18 may be pivoted downwardly to extend onto the floor of the trailer and permit the carriage to be moved into the trailer. The rear end of the trailer will also extend over a sump 27' located at the front upper edge of the platform P', for drainage of both wash water and rinse water into an auxiliary tank A, as shown in FIGS. 11 and 16. Located at the bottom of the sump 27' is a grating 28' beneath which may be located screens corresponding to screens 29 and 30 of FIG. 2, within frames 31. The floor 17' of platform P' overhangs dock D', as in FIG. 10, but when the platform P' is in the dotted position of FIG. 10, the floor 17' will merely extend rearwardly from an auxiliary waste tank A. As in FIGS. 10 and 11, the platform P' is supported by corner posts 110 carrying heavy duty casters 111, while the platform is pivotal about an upright post 112, through a pivot joint 113. One of the casters 111 is driven by a motor 114 mounted on the corresponding post 110 and driving the caster through a chain and sprocket drive 115, as in FIGS. 11 and 16.

Since the platform P' merely moves through 90° from the rest position shown in full to the operating position shown in dotted lines in FIG. 10 and then back again, each of the casters 111 may be fixed in position, so that its axis of rotation will lie along a line extending from the center of the pivot joint 113. The wash water tank W, as in FIG. 14, is separated from the rinse water tank W' by a partition 116, as in FIGS. 10, 13 and 14. The Dock D' is provided with an access door 117 for the rinse water tank and an access door 118 above the wash water tank, while the platform P' is provided with an access plate 119 for access to the auxiliary waste water tank A of FIG. 16.

As in FIG. 11, the waste water collecting in the tank A of the platform P' is pumped by a high volume, low pressure pump 121 beneath the tank, which is connected by a pipe 122 with the wash water tank, with a flexible hose 123 interposed between two sections of the pipe 122, to accommodate movement of the platform through 90° and then back again. A flexible hose 13' connects the pump mounted in dock D' for transferring wash water and then rinse water to a rotating joint 124 on the axis of reel R" on which the hose connected with the carriage is reeled. An electrical cable 15' connects with a rotating joint 124' for transmitting electrical power and electrical signals to the carriage. Instead of utilizing two separate reels, one for the water and the other for the electrical cable, the electrical cable which carries power and signals to the trailer is conveniently attached to the hose which runs from the reel R″ to the trailer, similar to hose 14 of FIG. 2. The reel R″ is supported for rotation, as by a framework 37′, and is driven in a suitable manner, as by an electrical motor operating in a conventional way. The auxiliary waste tank A, as in FIG. 16, is provided with side walls 125 and a bottom wall 126, with end walls corresponding to the side walls. A rear fence 127, such as having upright pipes, with a cross pipe extending parallel to the platform along the tops of the upright pipes, may be provided for safety purposes and also to prevent the carriage from being driven rearwardly over the rear edge of the platform P′, as through malfunction of an electrical control element.

Figure 12:
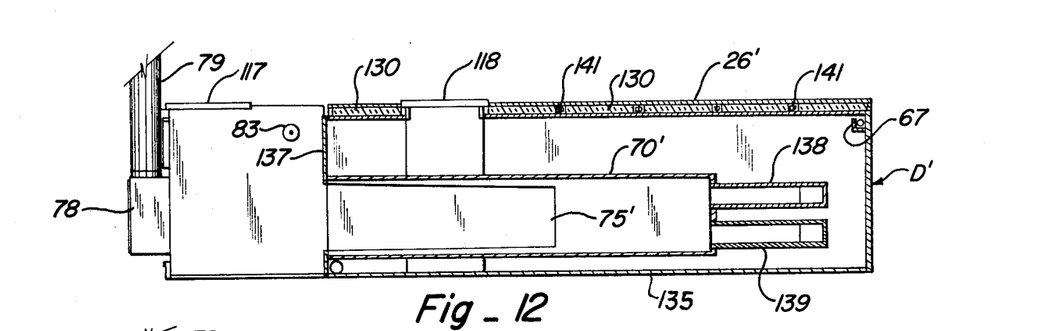
FIG. 12 is a vertical section taken along line 12—12 of FIG. 10, through a wash water tank.
Figure 13:
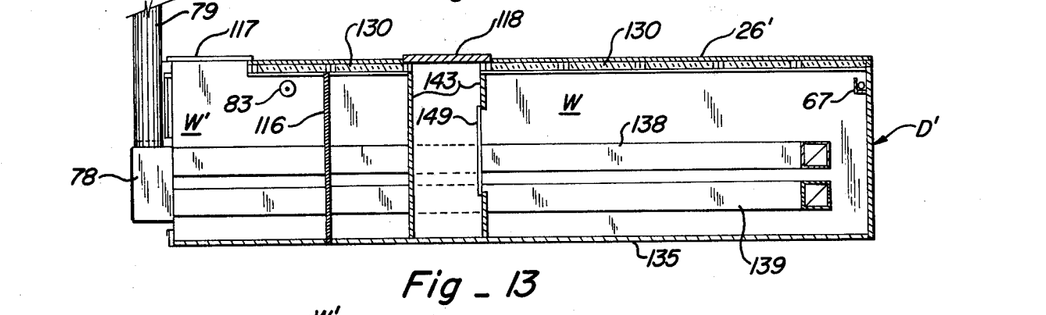
FIG. 13 is a vertical section taken along line 13—13 of FIG. 10, through a rinse water tank and a portion of the wash water tank.

As in FIGS. 12 and 13, the top plate 26′ of the dock D′ may be provided with insulation 130 on the underside, to minimize heat loss from the heated wash water. If desired, the side walls 131 and 132, as well as the rear wall 133 and front wall 134, may similarly be insulated. It is normally unnecessary to insulate the bottom wall 135, which also extends beneath the rinse water tank W′, while the side walls 136 and front wall 137 of tank W′ may also be insulated, if desired.

As shown in FIGS. 12–14, the burner 75′ within burner housing 70′ is adapted to discharge heated gases into the burner housing and thence through vertically spaced pipes 138 and 139, which extend toward the rear of the wash water tank W, then toward the opposite side thereof and then forwardly, for passage through partition 116 and through the rinse water tank W′, for passage into a muffler 78 and discharge through a stack 79. As before, the feed to wash water tank W consists of the previously used wash water and rinse water, since the rinse water, being fresh, provides a sufficient fresh proportion of the waste water to produce the desired washing action. The supply of fresh water to the rinse water tank W′ is through a control valve actuated by a float 83, as before. The insulation 130 and top 26′ of dock D′ are supported by a series of lateral beams 141 between which the insulation 130 extends, while cross beams 142 support the access plates 117 and 118. The space beneath access plate 118 may be utilized to accommodate the pump corresponding to pump 84 of FIG. 6, as well as piping and valves installed in the space around pump 84 through partitions 143 of FIG. 13 at the front and rear of such space and corresponding partitions at each side thereof. One of the partitions 143 may carry a removable plate 144 for access to the interior of the wash water tank W. The rear wall and one side wall of the wash water tank W may be provided with a trough 67 near the top and inclined slightly downwardly to the front thereof, for discharge of overflow into the trough through a drain pipe 68, as shown in FIG. 14.

The carriage C′ of FIG. 15, stored on top of platform P′, may correspond to the carriage C′ of FIG. 9, thus having a pair of rotating heads H, each having a series of pipes and nozzles extending outwardly from a hub which is rotated, as by being driven by a motor 48′, through belt and pulley or chain and sprocket connections 41′. The carriage C′ may also be provided with a series of supporting wheels 10, while an axle 61′ between two of the wheels may be driven by a reversible motor 59′. If desired, all of the wheels may be driven by the same motor. As before, lateral guide rollers 38 normally engage the inside walls of the trailer to be washed, but also, as in FIG. 15, engage guide rails 145 installed on the platform P′. The guide rails 145 may be provided with curved entrance portions 146 to insure that the carriage will return to its initial position. A dual microswitch 148 is spaced above rail 145 and is provided with a pair of contacts engageable by a finger 149. Finger 149 is mounted on the carriage above the height of wheels 10 and rollers 38, for starting the wash water pump as the carriage begins its travel toward the interior of the trailer, and also for turning off the water pump when the carriage returns to the same position. It will be noted from FIG. 15 that the heads H are disposed rearwardly of the sump 27′ which is overhung by the rear edge of the trailer floor. Adjacent the rear edge of platform P′ is a microswitch 150, also mounted on a guide 134 but above the rollers 10 and side wheels 38 and actuable by a finger 151 extending upwardly from a side beam 35′ of the carriage, or any other suitable part thereof. The microswitch 150 may be connected in the control circuit for the drive motor on the carriage or may control a solenoid which, when energized, will move the carriage motor switch to its off position. In either event, when the microswitch 150 is opened or closed, as the case may be, the carriage C′ will be stopped before the rear wheels 10 of the carriage reach the rear edge of the platform P′.

Figure 17:
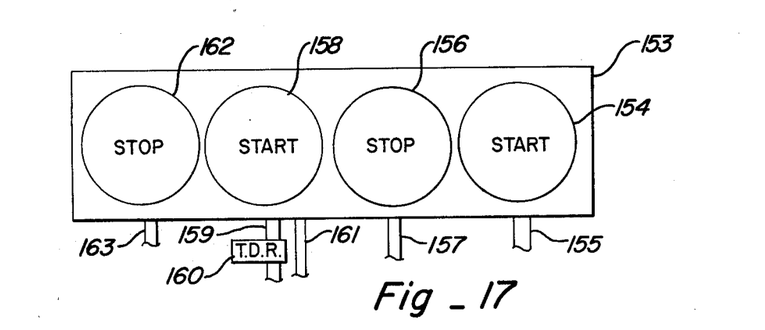
FIG. 17 is a front view of a pushbutton control panel.

In FIG. 17 is shown a pushbutton panel 153 on which is installed a pushbutton 154 connected by a cable with the carriage drive motor for starting the carriage into the trailer. Also installed on the panel is a pushbutton 156 connected by cable 157 with the appropriate controls to stop the carriage at any time during its inward trip for any good reason, such as a dislodged meat hook accidentally left in the trailer. The panel further mounts a start button 158 connected by a cable 159 with the appropriate controls for starting the carriage drive motor in a reverse direction, but through a time delay relay 160 which produces a delay sufficient to permit rinse water to reach heads H before the carriage starts its return trip. A cable 161 connects with controls which start the motor pump 82 and open solenoid valve 89 to supply rinse water to the pump, as well as opening solenoid valve 55 on the carriage. A button 162 may be pushed by stop the carriage at any time on its return trip, such as difficulty in reeling the hose 14. A cable 161 connects the switch controlled by button 162 with the controls for the drive motor on the carriage. Cable 161 may also be connected with the controls for the motor for water pump 84 and the motor 48 which rotates the heads H, for also stopping one or more of these motors.

Figure 18:
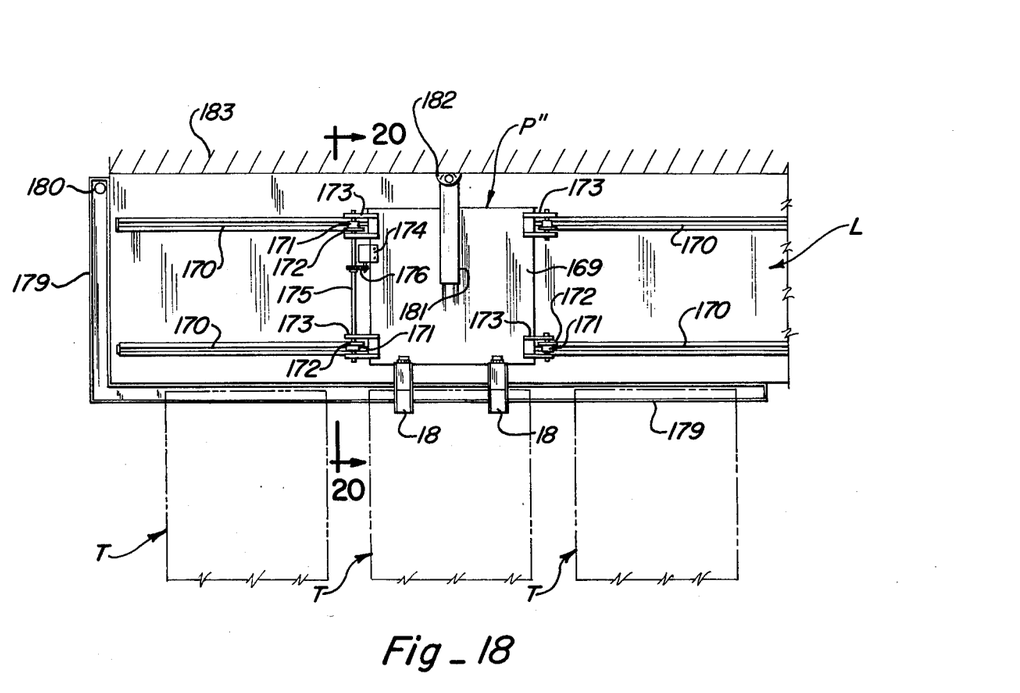
FIG. 18 is a top plan view of an alternative embodiment, which includes a dock to which several trailers may be backed up at the same time and a movable, wheeled platform for positioning the carriage in alignment with the respective trailers, in turn.
Figure 19:
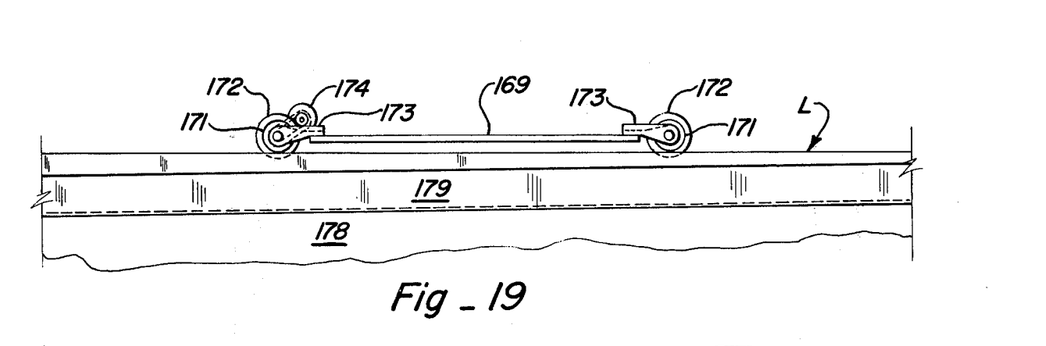
FIG. 19 is a partial front elevation, on an enlarged scale, of the dock and platform of FIG. 18.
Figure 20:
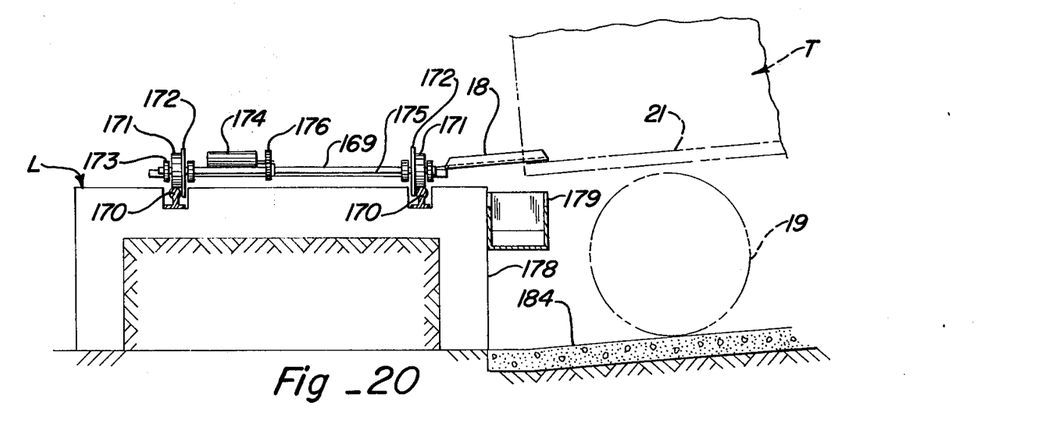
FIG. 20 is a vertical cross section, on an enlarged scale and taken along line 20—20 of FIG. 18.

In the embodiment illustrated in FIGS. 18–20, a wheeled carriage is constructed in a manner similar to either embodiment previously described, so as to be stored upon a platform P″ which has a deck 169 and is adapted to be moved laterally along a loading dock L provided with a set of parallel rails 170. The platform P″ is supported by wheels 171 which engage the respective rail 170 and the deck 169 is preferably underslung, i.e. the upper surface thereof is normally below the level of the axis of rotation of the wheels 171 to reduce the vertical distance between the platform and the bed of a trailer T. Each wheel is provided with a flange 172 to maintain the platform P″ in position on the rails and is connected to the deck by a yoke 173. One set of wheels is driven by a motor 174 which is mounted at one side of the platform and is connected to a shaft 175 extending between the wheels on that side, by a chain and sprocket drive arrangement 176. The front face 178 of the loading dock is provided with an inclined trough 179 attached thereto, but spaced below the top of the loading dock, so that a trailer T may be backed until the rear of the trailer bed overlies the trough 179, as shown in dotted lines in FIGS. 18 and 20, but is spaced from the front edge of the loading dock, so that water draining from the trailer, during washing of the interior thereof, will flow into trough 179 and thence be conducted to a tank for heating wash water, similar to the wash water tanks previously described. Thus, the trough 179 may extend around the end of the loading dock, as in FIG. 18, to a drain pipe 180 from which the recovered water may be pumped through a filter or screen and to the wash water tank. The height of the upper edge of trough 179 is such that the trailer may be backed toward the loading dock to substantially abut the front surface of the loading dock. Thus, the rearward and downward slant of the trailer bed need not interfere with use of the loading dock for its customary purpose.

A carriage, such as similar to the carriage C of FIG. 1 or the carriage C' of FIG. 9, is supported on the bed 169 of the movable platform for forward movement on carriage ramps 18 into the interior of the trailer, with the water jets being rotated and the carriage being driven in the same manner. The controls for the carriage are similar to those of carriage C' of FIGS. 15 and 16, including controls as illustrated in FIG. 17. The platform is provided with a reel, such as similar to the reel R' or R", for winding the hose through which wash water and rinse water are supplied to the carriage, as well as an electrical control cable preferably attached to the hose. The hose and cable connection to the platform P" may be supported by an overhead horizontal arm 181 which is mounted on a pivot 182 attached to a building 183 abutting the loading dock L and adapted to swing to one side or the other to accommodate placement of the platform P" at any of the trailers T.

A ramp 184 is specially constructed to lower the rear wheels 19 of a trailer T to a position in which the bed 21 of the trailer will slope downwardly to the rear, so that wash water or rinse water, after spraying against the inside surfaces of the trailer, will flow along the bottom of the trailer for discharge into trough 179. The wash water tank and rinse water tank, together with heaters, pump and control valves for the same may be located inside the building 182 or exteriorly thereof, such as at the end of the dock or any other suitable position.

As will be evident, by means of drive motor 174, the platform P" may be moved to a position in alignment with any of the trailers, such as those shown by dotted lines, then the ramps 18 for the carriage wheels, conveniently pivotally attached to the front edge of platform deck 169, are moved downwardly to the position of FIG. 18 from the upright position used during non-use of the carriage and movement of the platform to a different position. The carriage, which is mounted on the platform during positioning, may then be started into the trailer. It will be noted that the motor 174 is a reversible motor and that the controls therefor will include a start button for each direction, with a stop button for terminating movement, as in either direction. As before, the carriage is provided with a limit switch which will stop inward carriage movement when the limit switch encounters the inside front wall of the trailer space. After a suitable delay, the carriage may be started on its return path, spraying rinse water instead of soapy water, then stopped when it reaches its normal storage position on the platform, as by actuation of a limit switch on the platform.

When the trailer has been used for other purposes, such as carrying chemicals, it is desirable to use a pre-wash rinse to remove chemicals which might be returned to the wash water tank and thereby be sprayed into other trailers to be washed, which are to carry meat or other food items. For this purpose, the carriage may be moved into the trailer without discharging any water, but supplied with water on the return trip, to rinse out any accumulated chemicals. The water for the pre-wash rinse may be obtained from the wash water tank, since the soapiness of the water is no deterrent to its use for that purpose. The water draining from the trailer, during the pre-wash cycle, is not returned to the wash water tank, but is either diverted to a sewer or to use in washing the outside of the trailer. Such diversion may be accomplished by a diverter valve in the line 122 of FIG. 10 or at the trough drain 180 of FIG. 18. For the embodiment illustrated in FIGS. 1-9, the drain area may be provided with a bottom panel, below fine screens 31, with a short pipe for flow into the wash water tank. The diverter valve may be placed in this pipe, with a drain line from the valve to the sewer or to another tank in which water for washing the outside of the trailer is stored.

Although different embodiments of this invention have been illustrated and described, it will be evident that other embodiments may exist and various changes may be made, all without departing from the spirit and scope of this invention.

What is claimed is:

1. Apparatus for washing an interior space of a trailer and the like, comprising:

a carriage having wheels and drive means for moving said carriage inwardly from the rear to the front of the trailer space and outwardly from the front to the rear thereof;

a series of nozzles mounted on said carriage for spraying wash water and rinse water against the walls and ceiling of said trailer space during inward and outward movement of said carriage;

means for storing a supply of heated, soapy wash water;

means for supplying said wash water to said carriage nozzles, including hose means extending to said carriage and a pump for pumping said wash water through said hose;

means for storing a supply of rinse water;

means for supplying rinse water to said carriage nozzles through said hose means during the return trip;

control means for starting said carriage on its inward trip and for stopping said carriage on reaching the inner front wall of said space;

means for starting said carriage on its return trip and causing rinse water to be supplied to said nozzles; and time delay means for delaying the start of movement of said carriage on said return trip while rinse water is being supplied to said nozzles until the wash water has been cleared from said hose means by the rinse water.

2. Apparatus for washing an interior space of trailers and the like, comprising:

a carriage having wheels and drive means for moving said carriage inwardly from the rear to the front of the trailer and outwardly from the front to the rear thereof;

a series of nozzles mounted on said carriage for spraying wash water and rinse water against the walls of said trailer space during inward and outward movement of said carriage;

means for supplying wash water to said nozzles during movement into said trailer space;

means for supplying rinse water to said nozzles during return movement of said carriage;

means for starting said carriage for entry into said trailer space and for stopping said carriage when the inner front wall of said trailer space is reached;

means for starting said carriage on the return trip thereof;

a platform normally supporting said carriage and pivotal about an axis to place said carriage in position to enter said space;

means to stop said carriage when reaching its original position on said platform at the end of said return trip,;

a dock having opposite ends to which a trailer may be backed;

said platform being pivotal through 180° to position said carriage for entry into the trailer space at either end of said dock;

said dock containing dual wash water tanks, with a drain into the respective tank at the ends of said dock, said drains receiving used wash water and rinse water flowing from the rear end of said trailer as said washing and rinsing operations proceed; and means for equalizing the amount of liquid in the respective tanks.

3. Apparatus as defined in claim 2, wherein:

said dock is provided with a rinse water tank intermediate said wash water tanks; and heating means including piping extending from each wash water tank through said rinse water tank and then through the opposite wash water tank.

4. Apparatus for washing an interior space of trailers and the like, comprising:

a carriage having wheels and drive means for moving said carriage inwardly from the rear to the front of the trailer and outwardly from the front to the rear thereof;

a series of nozzles mounted on said carriage for spraying wash water and rinse water against the walls of said trailer space during inward and outward movement of said carriage;

means for supplying wash water to said nozzles during movement into said trailer space;

means for supplying rinse water to said nozzles during return movement of said carriage;

means for starting said carriage for entry into said trailer space and for stopping said carriage when the inner front wall of said trailer space is reached;

means for starting said carriage on the return trip thereof;

a platform normally supporting said carriage and pivotal about an axis to place said carriage in position to enter said space;

means to stop said carriage when reaching its original position on said platform at the end of said return trip;

a dock provided with a wash water tank and a rinse water tank;

said platform being movable between a retracted position alongside said dock and a position at 90° thereto, whereby a trailer may be driven alongside said platform to a position forwardly of said platform;

said platform then being movable through 90° to abut the rear end of said trailer;

said platform being provided with an auxiliary drain tank and drain means at the front edge of said dock for receiving water draining from a trailer during washing; and pumping means for returning liquid from said auxiliary tank to said wash water tank of said dock.

5. Apparatus as defined in claim 4, including:

heating means extending through said wash water tank and then through said rinse water tank of said dock.

* * * * *